(No Model.)
J. H. BURDICK.
NUT LOCK.
No. 377,188. Patented Jan. 31, 1888.
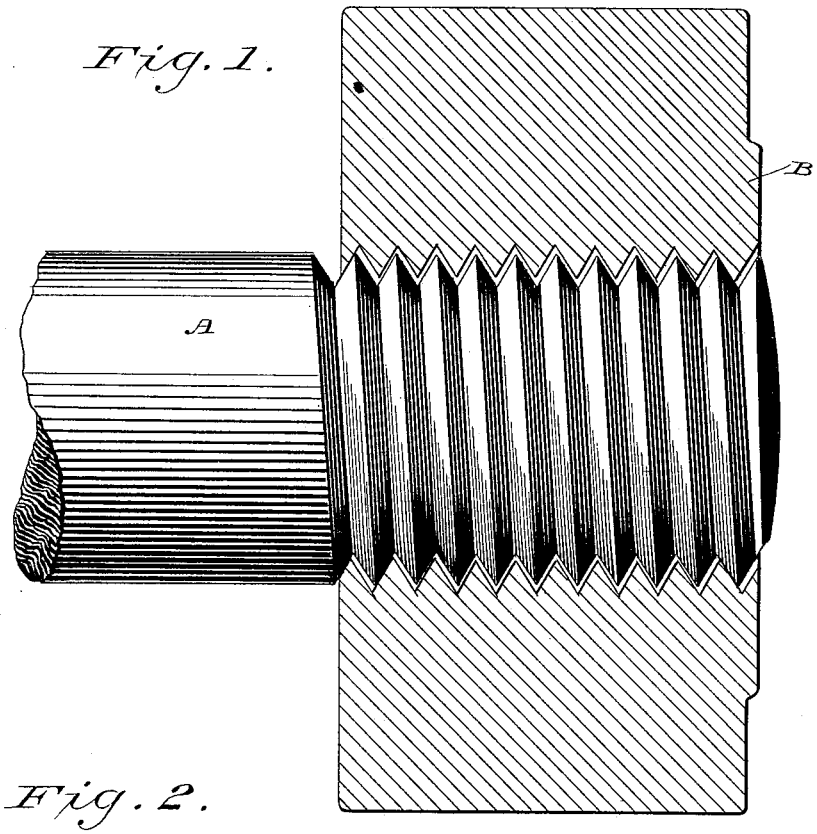
Witnesses
Geo. W. Young
N. E. Oliphant
Inventor
J. H. Burdick,
By Stout & Underwood
Attorneys

UNITED STATES PATENT OFFICE.

JUSTIN H. BURDICK, OF UTICA, ASSIGNOR TO THE ELASTIC NUT COMPANY, OF MILWAUKEE, WISCONSIN.

NUT-LOCK.

SPECIFICATION forming part of Letters Patent No. 377,188, dated January 31, 1888.

Application filed June 10, 1887. Serial No. 240,857. (No model.)

*To all whom it may concern:*

Be it known that I, JUSTIN H. BURDICK, of Utica, in the county of Dane, and in the State of Wisconsin, have invented certain new and useful Improvements in Nuts; and I do hereby declare that the following is a full, clear, and exact description thereof.

My invention relates to devices for securing nuts firmly upon the screw-threaded portions of bolts, and will be fully described hereinafter, and pointed out in the claim.

In the drawings, Figure 1 is a view of the end of a bolt, with the nut shown in section in place thereon. Fig. 2 is a view of one of the nuts detached, and Fig. 3 is an end view of the nut and bolt together.

A represents the bolt, and B the nut, the latter being made of elastic material—such as steel—and slitted and analogous to that shown in my Patent No. 356,744, granted February 1, 1887, save that the bore is not flattened nor rendered elliptical, as in said patent; but instead thereof the pitch of the nut-threads is made different from the pitch of the bolt-threads. For illustration, let the pitch of the bolt-threads be ten to the inch and the pitch of the nut-threads be ten and one-eighth to the inch. Now, inasmuch as it would be impossible for a rigid nut with this variation of pitch to be screwed to place on the bolt, my nut, to accomplish this, will open at the slit *a*, and may then be readily screwed to place, the coarser threads on the bolt preventing contact the depth of the threads; but the impingement between the bolt and nut being exceedingly tight and firm at the beginning and end of the thread of the nut, all jar and vibration to which the nut and bolt are subjected tend only toward a closer approach of the separated threads and firmer impingement of those in contact.

Having thus fully described my invention, what I claim as new, and desire to secure by Letters Patent, is—

The combination of a screw-threaded bolt with a slitted elastic nut, the bore of the bolt and nut being normally the same, but the pitch of the threads being different.

In testimony that I claim the foregoing I have hereunto set my hand, at Milwaukee, in the county of Milwaukee and State of Wisconsin, in the presence of two witnesses.

JUSTIN H. BURDICK.

Witnesses:
H. G. UNDERWOOD,
MAURICE F. FREAR.